Sept. 25, 1956 L. P. CROSET 2,764,003
FLEXIBLE COUPLINGS
Filed Aug. 30, 1954 2 Sheets-Sheet 1
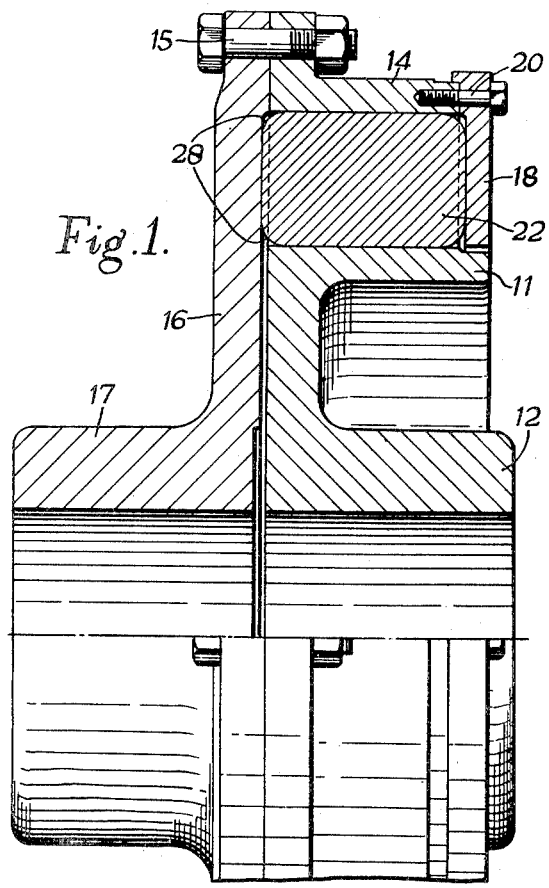
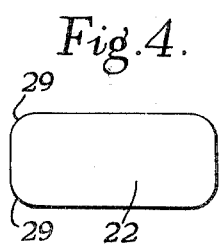
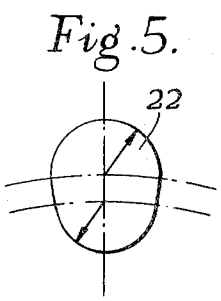
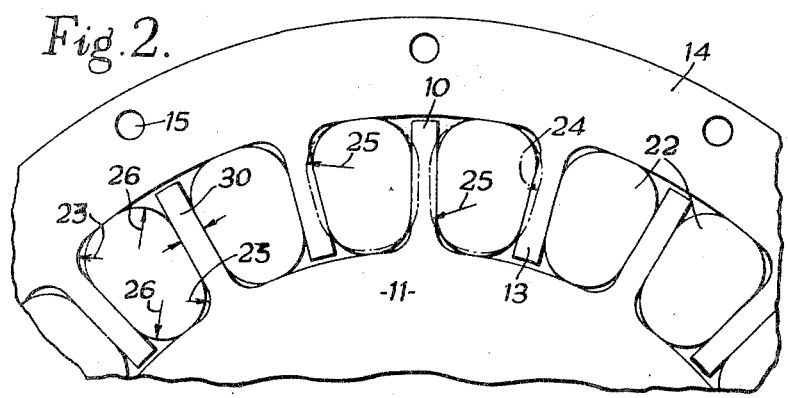
INVENTOR
LOUIS P. CROSET
BY
Young, Emery, & Thompson
ATTORNEYS

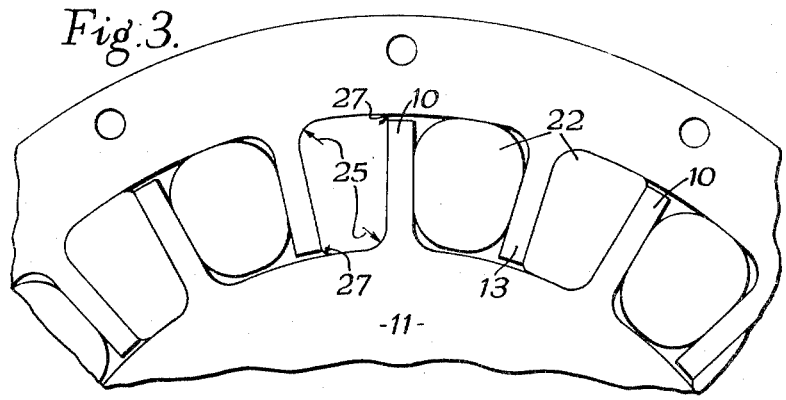
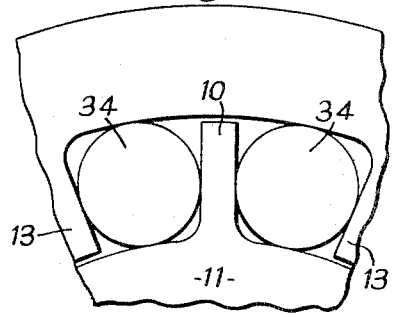 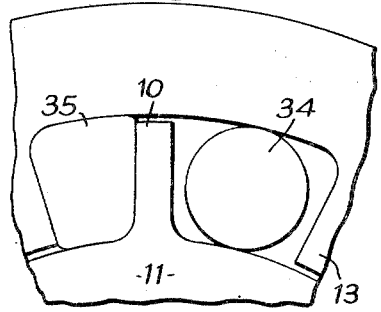
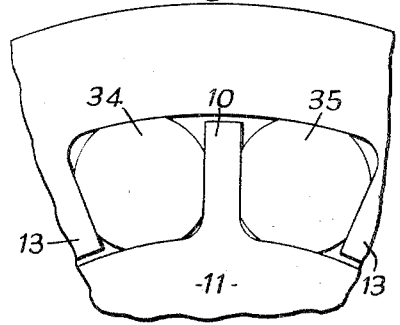 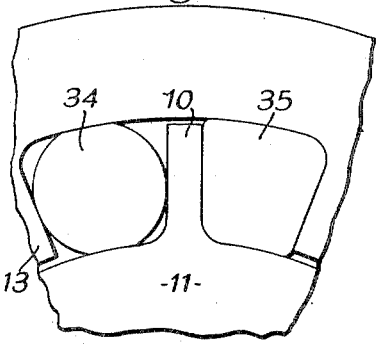

United States Patent Office 2,764,003
Patented Sept. 25, 1956

2,764,003

FLEXIBLE COUPLINGS

Louis P. Croset, Fixby, Huddersfield, England

Application August 30, 1954, Serial No. 453,097

Claims priority, application Great Britain September 30, 1953

2 Claims. (Cl. 64—14)

This invention relates to flexible couplings, dampers, flexible gear wheels, or the like devices of the kind comprising two annular sets of blades arranged alternately with one blade of one set between and spaced from two blades of the other set, an inner annulus within the blades, an outer annulus around the blades, thereby forming an annular series of cells, end plates closing the ends of the cells, and blocks of elastic material in said cells. According to the invention of British Patent No. 641,425 the volume of the elastic blocks is so selected that (a) spaces are left in the cells under no-load conditions for deformation of the blocks in the radial and/or axial directions and (b) when the blocks which are subject to further compression when the coupling or the like is under load, completely fill the cells, the blocks in the other cells are still slightly compressed. The spaces may be formed by making the blocks of less size radially or axially than the cells. The blocks were preferably rounded off at their edges. The blades were preferably of constant thickness from and including their free ends to a position adjacent their attachment to the inner or outer annulus with which they may be integral. The blocks may be wedge-shaped in axial view and rectangular in longitudinal section.

While these devices offer high torsional resilience and freedom from backlash and have given very successful results in practice, it is an object of the present invention to enable them to withstand still heavier loads without destroying the elastic blocks, and to provide greater torsional resilience and other useful torsional characteristics.

To this end according to the present invention we make the elastic blocks with width and radial dimensions at least as large as those of the cells but spaces are left along the four inner and outer edges of the blades, i. e. at and lengthwise between the corners of the cells. The length of the blocks may also be at least as large as that of the cells but in some cases could be slightly smaller. Moreover, we find it to be important to round off the edges of the blocks in a manner which facilitates the bulging of the blocks into these spaces with a close approach to a rolling action on the adjacent surfaces of the cell.

The invention will now be further described with reference to the accompanying diagrammatic drawings wherein:

Figure 1 is a vertical section of a flexible coupling made in accordance with the invention;

Figure 2 is a view of part of the device seen in axial view looking at the right hand end of Figure 1 but with an end plate removed, the device being shown in its no-load condition;

Figure 3 is a view similar to Figure 2 but showing the device under maximum load;

Figure 4 is a plan view of a rubber block;

Figure 5 is an end view of a rubber block;

Figures 6 to 9 are similar views showing a modified form of elastic members, Figures 6 and 8 showing the device unloaded and Figures 7 and 9 showing the device under maximum load.

Referring first to Figures 1 to 5, an annular set of blades 10 is carried by an inner annulus 11 which has a hub 12 which can be mounted on one of a pair of aligned shafts. The other set of blades 13 is carried by an outer annulus 14 which is bolted by bolts 15 to a back plate 16 carried by a hub 17 that can be mounted on the other shaft. The annuli and blades form cells closed at one end by the back plate 16 and closed at the other end by an end plate or ring 18 attached to the annulus 14 by bolts 20. The elastic members are in the form of rubber blocks 22.

The blades are radiused at their roots on a radius indicated at 23 (Figure 2), the length of the radius (hereinafter referred to as R) being preferably about equal to or slightly greater or less than the thickness 30 of the blades, e. g. 0.75 to 1.2 of such thickness. The blocks 22 are wedge shaped viewed axially and in their free condition before insertion into the cells have a shape indicated at 24 the width of which is greater than that of the cells. The corners are rounded off as indicated by radius 25 the length of which is 1.5 to 2.5 R (e. g. 2 R). When compressed into the cell in the unloaded condition of the device shown in Figure 2 the radius at the corners will be as shown at 26 the length of which has become about 1.2 to 1.8 R, e. g. 1.6 R and under load as shown in Figure 3 the radius shown at 27 will become still smaller e. g. down to 0.3 R or 0.4 R at the free ends of the blades and down to R at the roots of the blades. The blocks are also rounded off as seen in side view at 28 (Figure 1) and in plan as at 29 (Figure 4) to a radius preferably not exceeding R e. g. 0.4 to 0.8 R. An average value would be about 0.5 R. The length of the blocks is preferably such as to fill the cells lengthwise even under no load of the device.

The side faces of the blocks in free condition form an included angle about 7 to 15% larger than that of the cell, a single radius semi-circle connecting the side faces at the outer ends and a single radius semi-circle connecting the side faces at the inner ends (as shown in Figure 5). The area of the cell contacted by the block under no-load conditions may be from 30 per cent to 60 per cent of the total area of the cell. Similarly the contour of the cell in axial view contacted by the block may be from 30 to 60 per cent of the total contour.

In the unloaded condition of the blocks spaces are left at and along all four corners of each of the cells the rubber block contacting the inner and outer annuli and both the adjacent blades. The spaces become filled by the rubber as load increases.

Blocks made as above described tend under increasing load to fill out the spaces with a rolling engagement with the cells, and similarly as load is diminished tend to disengage with a rolling action, whereby rubbing of the blocks which tends to disintegrate the rubber is diminished. The devices can therefore offer a very high degree of torsional resilience whilst maintaining or increasing the life of the blocks. Moreover, the reduction of the area of contact between the block and the cell by at least 50%, compared with the existing design, makes insertion of the blocks during initial assembly much easier and also facilitates removal of the blocks for either inspection or replacement purposes.

The invention facilitates the use of devices in which the surfaces of the cells are left in the as cast condition, whereby they can be produced at substantially lower cost than when these surfaces have to be machined to reduce friction on the blocks.

By suitable arrangement and dimensioning of the parts of the device, excellent shock absorbing characteristics can be achieved and the degree of torsional resilience varied within reasonably wide limits or values to meet any particular requirements of connected shafting and/or resilient gear wheels, for example from plus or minus one half degree up to plus or minus five degrees.

As shown in Figures 6 to 9 the rubber blocks may actually be in the form of cylinders 34, 35 which for maximum resilience of the device will have such a diameter that each roller just touches the inner and outer annuli and the opposite blades at four generatrices which are approximately equally spaced apart as shown in Figure 6. With this arrangement when the device is under maximum load in one direction as shown in Figure 7, one set of alternate rollers 34 will be out of engagement with the blades while the other blocks 35 fill the corner spaces. If the device is required to have less resilience blocks of larger diameter are inserted so that they are compressed when the device is in its no load condition as shown in Figure 8. When the device is under maximum load in one direction as shown in Figure 9, one set of alternate blocks 35 will fill the cells while the other blocks 34 are still under compression or at least touching adjacent blades.

The use of rubber cylinders or rollers offers the possibility of a higher degree of torsional resilience than is possible with the wedge-shaped rubber blocks, and also makes it possible to achieve variable torsional stiffness of non-linear characteristics, which increases appreciably with increased torque load instead of practically constant torsional stiffness during the early stages of deformation as is the case with the wedge-shaped rubber blocks, while maintaining the avoidance of overheating by friction and the avoidance of overstressing; and at the same time providing a simple way of varying the degree of resilience of the device according to requirements. Their use also substantially reduces the production costs of the moulds required in the manufacture of the elastic members and facilitates assembly and maintenance of the device.

As these rubber rollers are made in standard steel tubes and not in very expensive split moulds which are a necessity for the production of the wedge-shape blocks, a considerable saving in production cost is effected and the changeover from one size of roller to one slightly larger or smaller in order to obtain different torsional stiffness characteristics can be made almost at will and does not present a major problem as is the case with wedge-shape blocks or any other shape of moulded force transmitting element requiring a precision made multipart mould. Further, the use of rubber rollers facilitates the assembly and maintenance of the device.

The cylinder, in the unloaded condition of the coupling, leaves spaces at the four corners of the cell whereby a high torsional resilience is provided together with a natural and uniform method of deformation of the cylinder.

The resilience of the device could readily be increased or decreased to the desired extent by replacing the blocks with others of smaller or greater diameter or by replacing the blocks of a given diameter by others having a different degree of hardness or hardness value.

The coupling may be used for connecting shafts having a misalignment of say 2 or 3 degrees, e. g. the cardan shaft of a motor vehicle. For this purpose a pair of couplings will be used with the plates 16 facing each other and connected together. Each of the plates 16 may be replaced by a drum flanged at both ends, the drums being connected together by the adjacent flanges and having their other flanges bolted to the parts 14, 18.

I claim:
1. A flexible device comprising a driving element, a driven element, spaced apart projecting blades on the driving element, spaced apart blades on the driven element, which blades project alternately between the blades on the driving element, said alternating blades forming four-sided cells between said elements, front and rear walls substantially closing the axially opposite ends of the cells, means rigidly fixing said walls a fixed spaced distance apart, and elastic force-transmitting elements in the form of solid blocks of resilient material in said cells, each of said blocks in the unloaded condition of the device being under compression in the cell and contacting all six sides of the cell, said blocks being also of such size that the blocks which are compressed under load will completely fill the cells and contact said walls while the blocks in the other cells are still slightly compressed, said driving and driven elements providing inner and outer walls of said cells, the outer walls being at all times in contact with the radially outer surfaces of the blocks over the whole area of said surfaces, the elastic blocks having width and radial dimensions at least as large as those of the cells and at all times engaging the surfaces of the cells over substantially the full axial width of the cells, but said blocks and cells being relatively shaped to leave spaces along the four inner and outer edges of the blades, i. e. at and lengthwise between the corners of the cells, the roots of said blades being radiused and the adjacent parts of the blocks being rounded with a larger radius of curvature than the roots of the blades, the blades being of constant thickness from and including their free ends to a position adjacent their attachment to said elements, the blocks engaging said walls over an area at each end of the block not less than thirty per cent of the area of each cell contour viewed axially.

2. A flexible device as claimed in claim 1, and said blocks are shaped such that the ratio of the radius of the corners of the blocks (viewed axially) to the radius of the roots of the blades is between 1.5 and 2.5 when the blocks are free and when compressed in the cells under no-load condition of the device is between 1.2 and 1.8; the radius of the roots of the blades being from 0.75 to 1.2 of the thickness of the blade; and the ends of the blocks are rounded to a radius which is 0.4 to 0.8 of the radius of the roots of the blades.

References Cited in the file of this patent

UNITED STATES PATENTS

| | | |
|---|---|---|
| 309,679 | Bacon | Dec. 23, 1884 |
| 1,564,186 | Spicer et al. | Dec. 1, 1925 |
| 2,621,493 | Croset | Dec. 16, 1952 |
| 2,712,742 | Neidhart | July 12, 1955 |

FOREIGN PATENTS

| | | |
|---|---|---|
| 669,724 | Great Britain | Apr. 9, 1952 |